United States Patent
Caviezel et al.

(10) Patent No.: US 12,054,425 B2
(45) Date of Patent: Aug. 6, 2024

(54) WATERPROOFING SYSTEM

(71) Applicant: SIKA TECHNOLOGY AG, Baar (CH)

(72) Inventors: Dario Caviezel, Bremgarten (CH); Wolf-Rüdiger Huck, Gockhausen (CH); Herbert Ackermann, Tann (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 18/099,460

(22) Filed: Jan. 20, 2023

(65) Prior Publication Data

US 2023/0150875 A1    May 18, 2023

Related U.S. Application Data

(62) Division of application No. 16/623,058, filed as application No. PCT/EP2018/066614 on Jun. 21, 2018, now Pat. No. 11,597,684.

(30) Foreign Application Priority Data

Jun. 23, 2017   (EP) .................................... 17177703

(51) Int. Cl.
*C04B 24/26* (2006.01)
*B28B 3/22* (2006.01)
(Continued)

(52) U.S. Cl.
CPC ............ *C04B 24/2635* (2013.01); *B28B 3/22* (2013.01); *C04B 28/04* (2013.01); *C04B 41/009* (2013.01);
(Continued)

(58) Field of Classification Search
None
See application file for complete search history.

(56) References Cited

U.S. PATENT DOCUMENTS

| | | | |
|---|---|---|---|
| 4,589,804 A | 5/1986 | Paeglis et al. | |
| 5,271,781 A | 12/1993 | Anno et al. | |

(Continued)

FOREIGN PATENT DOCUMENTS

| | | |
|---|---|---|
| CN | 102815905 A | 12/2012 |
| CN | 103625077 A | 3/2014 |

(Continued)

OTHER PUBLICATIONS

Jul. 16, 2018 International Search Report issued in International Patent Application No. PCT/EP2018/066614.

(Continued)

*Primary Examiner* — Jeffrey D Washville
(74) *Attorney, Agent, or Firm* — Oliff PLC (57) ABSTRACT

A waterproofing system including a functional layer S1 including 10-80 wt.-% of at least one thermoplastic polymer P1 and 10-80 wt.-% of at least one solid particulate filler F, wherein the surface of the functional layer S1 has an Auto-correlation length of waviness W(Sal) of at least 50 μm. Further, a method for producing a waterproofing system and to the use of a mechanical surface treatment step to increase the waviness factor, determined as the ratio of the Root mean square roughness of waviness W(Sq) to the square of the Auto-correlation length of waviness W(Sal), of a surface of a functional layer S1.

13 Claims, 1 Drawing Sheet

(51) Int. Cl.

| | |
|---|---|
| *B29C 43/24* | (2006.01) |
| *B29K 23/00* | (2006.01) |
| *C04B 28/04* | (2006.01) |
| *C04B 41/00* | (2006.01) |
| *C04B 41/53* | (2006.01) |
| *C04B 41/72* | (2006.01) |
| *C04B 103/40* | (2006.01) |
| *C04B 111/27* | (2006.01) |

(52) U.S. Cl.
CPC .......... *C04B 41/5346* (2013.01); *C04B 41/72* (2013.01); *B29C 43/24* (2013.01); *B29C 2793/009* (2013.01); *B29K 2023/0625* (2013.01); *B29K 2023/083* (2013.01); *C04B 2103/40* (2013.01); *C04B 2111/27* (2013.01)

(56) References Cited

U.S. PATENT DOCUMENTS

| | | | |
|---|---|---|---|
| 5,316,848 A | 5/1994 | Bartlett et al. | |
| 5,543,188 A | 8/1996 | Te'eni | |
| 6,761,504 B1 | 7/2004 | Brandenberger et al. | |
| 8,793,862 B2 | 8/2014 | Weber et al. | |
| 2005/0196590 A1 | 9/2005 | Seth et al. | |
| 2015/0231863 A1 | 8/2015 | Knebel et al. | |
| 2018/0281347 A1* | 10/2018 | Gössi | B32B 27/18 |
| 2020/0011060 A1* | 1/2020 | Haynes | E04D 1/22 |

FOREIGN PATENT DOCUMENTS

| | | |
|---|---|---|
| CN | 103923600 A | 7/2014 |
| CN | 104583351 A | 4/2015 |
| CN | 105271916 A | 1/2016 |
| CN | 106478043 A | 3/2017 |
| JP | 2011-58219 A | 3/2011 |
| WO | 01/73242 A1 | 10/2001 |
| WO | 02/14063 A1 | 2/2002 |
| WO | 2004/057128 A1 | 7/2004 |
| WO | 2009/009667 A1 | 1/2009 |
| WO | 2009/111292 A2 | 9/2009 |
| WO | 2010/141032 A1 | 12/2010 |
| WO | 2011/041263 A1 | 4/2011 |
| WO | 2011/139466 A1 | 11/2011 |
| WO | 2013/063197 A1 | 5/2013 |
| WO | 2013/086722 A1 | 6/2013 |
| WO | 2015/199984 A1 | 12/2015 |
| WO | 2016/005457 A1 | 1/2016 |
| WO | 2017/083078 A1 | 5/2017 |
| WO | 2017/108826 A1 | 6/2017 |
| WO | 2017/108843 A1 | 6/2017 |
| WO | 2017/108844 A1 | 6/2017 |
| WO | 2017/108846 A1 | 6/2017 |

OTHER PUBLICATIONS

Jul. 16, 2018 Written Opinion issued in International Patent Application No. PCT/EP2018/066614.

Zhou, Q. "Experimental Study of Waterproof Membranes on Concrete Deck: Interface Adhesion Under Influences of Critical Factors" Materials and Design, vol. 30, 2009, pp. 1161-1168.

* cited by examiner

WATERPROOFING SYSTEM

This application is a Divisional of application Ser. No. 16/623,058, filed Dec. 16, 2019, which is a national stage of PCT/EP2018/066614, filed Jun. 21, 2018, which claims priority to EP 17177703.0, filed Jun. 23, 2017. The entire contents of the prior applications are hereby incorporated by reference herein in their entirety.

TECHNICAL FIELD

The invention relates to waterproofing system for use in the construction industry, for example for basements, roofing and tunneling applications to protect concrete structures against water penetration.

BACKGROUND ART

Waterproofing systems consisting of waterproofing membranes are commonly used in the construction industry for sealing bases, underground surfaces or buildings against water penetration.

State-of-the-art waterproofing membranes are monolayer or multilayer systems comprising at least one polymer-based barrier layer to provide watertightness. Typical polymers used in barrier layers include thermoplastics such as plasticized polyvinylchloride (p-PVC) and thermoplastic polyolefins (TPO) or elastomers such as ethylene-propylene diene monomer (EPDM) and crosslinked chlorosulfonated polyethylene (CSPE). One of the drawbacks of polymer-based barrier layers is their poor bonding properties; they typically show low bonding strength to adhesives that are commonly used in the construction industry, such as epoxy adhesives, polyurethane adhesives, and cementitious compositions. Therefore, a contact layer, for example, a fleece backing, is typically used to provide sufficient bonding of the polymer-based barrier layer and the structure to be waterproofed.

In waterproofing applications, the membrane is typically post-applied to an existing concrete structure. In this case the membrane is bonded with an adhesive or a sealing tape via its contact layer to the surface of the concrete structure to be waterproofed. In pre-applied waterproofing applications, however, the membrane is laid out before the concrete structure to be waterproofed is built. In this case, the membrane is placed with its barrier layer against an underlying structure or formwork and fresh concrete is then cast against the surface of the contact layer, thereby fully and permanently bonding the membrane to the surface of the hardening concrete.

In pre-applied waterproofing applications, typically an adhesive is used, to bond the barrier layer to the contact layer and to the fresh concrete cast against the contact layer. The adhesive should also enable the fresh concrete to penetrate deeply into to contact layer before hardening in order to provide high resistance to penetrating water.

One of the main challenges related to the multilayer waterproofing membranes is to ensure watertightness after infiltration in case of leak in the barrier layer. Watertightness after infiltration means in general that the sealing construction should be able to prevent the infiltrated water from penetrating to the space between the membrane and the waterproofed surface. A leak in the barrier layer can be a result of inward growing tree roots, material failure or tensile or shear forces directed to the membrane. If the watertightness after infiltration is lost, water is able to flow laterally underneath the membrane and to invade the interior of the building structure. In such cases the exact location of the leak in the barrier layer is also difficult to detect.

U.S. Pat. No. 8,793,862B2 describes a waterproofing membrane comprising a barrier layer, a composite layer arranged on one side of the barrier layer and a network of sealant between the barrier layer and the composite layer. The network of sealant is said to limit the size of area affected by penetrating water in case of water leakage in the barrier layer. In waterproofing applications the membrane is applied on a subsurface in such way that the barrier layer is directed against a concrete base and the composite layer is facing the concrete casted against the membrane. During the hardening process, the composite layer is penetrated by the liquid concrete forming a good bond with the hardened concrete.

US2015/0231863A1 discloses a waterproofing membrane including a barrier layer and a functional layer including a thermoplastic polymer that changes consistency under influence of highly alkaline media and an adhesive. Once the functional layer gets into contact with liquid concrete, the thermoplastic polymer dissolves and allows the adhesive to bond to the cast concrete. The functional layer may additionally comprise other thermoplastic polymers, fillers or concrete constituents. The construction of the functional layer is said to enable working with membranes in adverse weather conditions without diminishing the adhesive capacity of the membrane.

One disadvantage of state-of-the-art multilayer waterproofing membranes is related to the use of adhesives, which increases the complexity of the membrane build-up and consequently the production costs of such membranes. The adhesive has to provide good binding to the low surface energy polymers in the barrier layers, form a strong bond to the contact layer and to fresh concrete and have a good resistance to varying temperature ranges, UV irradiation and oxidation. Adhesives fulfilling all the requirements, if available at all, are expensive and thus increase the production cost of such membranes by a significant amount.

Another disadvantage of state-of-the-art multilayer waterproofing membranes is related to the use of fleece backings as contact layer to provide sufficient bonding between the membrane and the substrate to be waterproofed. In waterproofing and roofing applications the adjacent membrane sheets have to be homogenously joined to each other in a reliable way to ensure watertightness of the sealing construction. Membranes having a fleece backing cannot be joined by heat welding but instead the edges of the membranes have to be bonded together either with an adhesive or with a sealing tape adhered on top of the seam and/or under the seam. The use of an adhesive or a sealing tape to join adjacent membrane sheets complicates the installation process and increases application costs.

SUMMARY OF THE INVENTION

The objective of the present invention is to provide a waterproofing system, which can be used to protect surfaces against water penetration, for example in basement waterproofing, roofing and tunneling applications, and which fully and permanently bonds to concrete and other cementitious compositions cast onto the waterproofing system after hardening, as well as to adhesives commonly used in the construction industry.

Another objective of the present invention is to provide a waterproofing system, which retains watertightness after infiltration in case of a leaking barrier layer.

It was surprisingly found that a waterproofing system comprising a functional layer S1 comprising at least one thermoplastic polymer P1 and at least one solid particulate filler F dispersed in a continuous thermoplastic phase comprising the at least one thermoplastic polymer P1 and having a certain surface roughness, is able to solve or at least mitigate the problems related to State-of-the-Art waterproofing systems.

The subject of the present invention is a waterproofing system as defined in claim 1.

One of the advantages of the claimed waterproofing system is that it provides full and permanent bonding to cementitious compositions and watertightness after infiltration.

Other aspects of the present invention are presented in other independent claims. Preferred aspects of the invention are presented in the dependent claims.

DETAILED DESCRIPTION OF THE INVENTION

Figure 1:
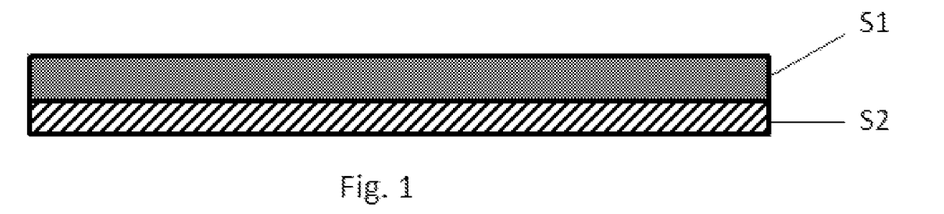
FIG. 1 shows a cross-section of a waterproofing system of the present invention comprising a functional layer S1 and a barrier layer S2.
Figure 2:
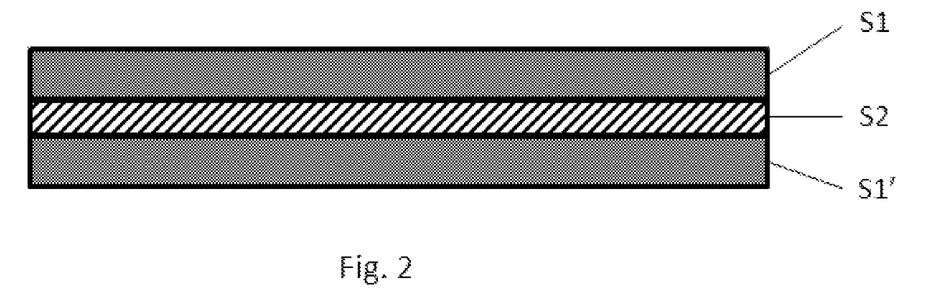
FIG. 2 shows a cross-section of a waterproofing system of the present invention comprising a first functional layer S1, a second functional layer S1' and a barrier layer S2.

The subject of the present invention is a waterproofing system comprising a functional layer S1 having a first major surface and a second major surface, the functional layer S1 comprising:

a) 10-80 wt.-%, preferably 25-75 wt.-%, of at least one thermoplastic polymer P1,
b) 10-80 wt.-%, preferably 25-75 wt.-%, of at least one solid particulate filler F, said proportions being based on the total weight of the functional layer S1, wherein in the functional layer S1, the particles of the at least one solid particulate filler F are dispersed in a continuous thermoplastic phase comprising the at least one thermoplastic polymer P1,
and wherein at least one of the first and second major surfaces of the functional layer S1 has an Auto-correlation length of waviness W(Sal), determined by means of the method cited in the description of at least 50 μm, preferably in the range of 100-1500 μm.

The term "polymer" designates a collective of chemically uniform macromolecules produced by a polyreaction (polymerization, polyaddition, polycondensation) where the macromolecules differ with respect to their degree of polymerization, molecular weight and chain length. The term also comprises derivatives of said collective of macromolecules resulting from polyreactions, that is, compounds which are obtained by reactions such as, for example, additions or substitutions, of functional groups in predetermined macromolecules and which may be chemically uniform or chemically non-uniform.

The term "cementitious composition" designates concrete, shotcrete, grout, mortar, paste or a combination thereof. The terms "paste", "mortar", "concrete", "shotcrete", and "grout" are well-known terms in the state-of-the-art. Pastes are mixtures comprising a hydratable cement binder, usually Portland cement, masonry cement, or mortar cement. Mortars are pastes additionally including fine aggregate, for example sand. Concrete are mortars additionally including coarse aggregate, for example crushed gravel or stone. Shotcrete is concrete (or sometimes mortar) conveyed through a hose and pneumatically projected at high velocity onto a surface. Grout is a particularly flowable form of concrete used to fill gaps. The cementitious compositions can be formed by mixing required amounts of certain components, for example, a hydratable cement, water, and fine and/or coarse aggregate, to produce the particular cementitious composition.

The term "fresh cementitious composition" or "liquid cementitious composition" designate cementitious compositions before hardening, particularly before setting.

The term "particle size" refers to the area-equivalent spherical diameter of a particle. The particle size distribution can be measured by laser diffraction according to the method as described in standard ISO 13320:2009. For determination of the particle size distribution, the particles are suspended in water (wet dispersion method). A Mastersizer 2000 device (trademark of Malvern Instruments Ltd, GB) can be used in measuring particle size distribution.

The "amount or content of at least one component X" in a composition, for example "the amount of the at least one thermoplastic polymer P1" refers to the sum of the individual amounts of all thermoplastic polymers P1 contained in the composition. For example, in case the composition comprises 20 wt.-% of at least one thermoplastic polymer P1, the sum of the amounts of all thermoplastic polymers P1 contained in the composition equals 20 wt.-%.

The functional layer S1 is preferably a sheet-like element having a first and a second major surfaces defined by its peripheral edges. The term "major surface" refers in the present document to the top and bottom surfaces of such sheet-like elements.

Preferably, the functional layer S1 comprises a heterogeneous mixture of at least two discrete phases, in particular a continuous thermoplastic polymer phase and a discontinuous solid filler phase. The continuous thermoplastic polymer phase comprises the at least one thermoplastic polymer P1 and optionally one or more other polymer materials and/or additives that can be mixed or interspersed sufficiently with the at least one thermoplastic polymer P1 so as to essentially constitute a single "thermoplastic polymer phase". The thermoplastic polymer phase is characterized as generally being capable of forming a melt by heating to above a specified temperature and then re-so solidifying when cooled sufficiently. Due to the presence of the thermoplastic phase, the functional layer S1 is weldable with other layers comprising thermoplastic polymers, which are compatible with the at least one thermoplastic polymer P1.

The discontinuous solid filler phase comprises the at least one solid particulate filler F, which may be present in the functional layer S1 as individual particles or as aggregates of one or more particles. These are at least partially, preferably completely surrounded by the continuous thermoplastic phase. In case the functional layer S1 contains one or more mineral binders, such as cement, it is essential that these do not form interconnected solid networks of hydrated mineral binders. It may be preferable that the functional layer S1 is essentially free, more preferably completely free, of interconnected solid networks of hydrated mineral binders. The particles of the at least one solid particulate filler F will not generally undergo a phase change to form a melt. Instead, the particles will remain as a discrete discontinuous solid phase interspersed throughout and among the continuous thermoplastic phase.

Preferably, the functional layer S1 comprises a homogeneously mixed mixture of the continuous thermoplastic polymer phase and the discontinuous solid filler phase. A "homogeneously mixed mixture" refers in the present document to compositions, in which the individual constituents are distributed substantially homogeneously in the composition. A homogeneously mixed mixture of a thermoplastic phase and a solid filler phase refers, therefore, to compositions in which the constituents of the solid filler phase are homogeneously/uniformly distributed in the thermoplastic polymer phase. For a person skilled in the art it is clear that within such mixed compositions there may be regions formed, which have a slightly higher concentration of one of the constituents than other regions and that a 100% homogeneous distribution of all the constituents is generally not achievable. Such mixed compositions with "imperfect" distribution of constituents, however, are also intended to be included by the term "homogeneously mixed mixture" in accordance with the present invention.

Preferably, the particles of the at least one solid particulate filler F are distributed throughout the entire thickness of the functional layer S1. The term "distributed throughout" means that essentially all portions of the functional layer S1 contain solid filler particles but it does not necessarily imply that the distribution of the solid filler particles is completely uniform throughout the functional layer.

It has been found out that the concrete adhesion strength of the waterproofing system depends, at least partly, on the surface roughness, in particular on surface waviness, of the functional layer S1.

The term "concrete adhesion strength of a waterproofing system" designates in the present document the average peel resistance [N/50 mm] per unit width of the waterproofing system upon peeling the waterproofing system from a surface of a concrete specimen, which has been casted on the surface of the functional layer and hardened for 28 days under standard atmosphere (air temperature 23° C., relative air humidity 50%).

The term "waviness" refers in the present document to surface irregularities upon which surface roughness is superimposed, which irregularities have a significantly longer wavelength than irregularities associated with surface roughness. The observed increase of concrete adhesion strength is estimated to result from the ability of the fresh cementitious composition, such as fresh concrete, or an adhesive, applied on the surface of the functional layer to establish further mechanical interlocking between the functional layer S1 and the cementitious composition/adhesive upon hardening.

The waviness of a surface can be quantified using three-dimensional (3D) surface roughness parameters, which have been calculated from a waviness profile obtained by filtering a measured primary profile using a suitable $\lambda_c$ and optionally $\lambda_f$ profile filters. The 3D-surface roughness parameters can be determined according to ISO 25178 standard.

In particular, it was found out that the measured concrete adhesion strength depends on the root mean square roughness of waviness (W(Sq)) and on the auto correlation length of waviness (W(Sal)) of the functional layer S1. The terms "root mean square roughness of waviness" and "auto correlation length of waviness" designate the respective 3D-surface roughness parameters calculated using the waviness profile. Furthermore, an especially strong positive correlation was found between concrete adhesion strength and a waviness parameter determined as ratio of the root mean square roughness of waviness (W(Sq)) and square of the auto correlation length of waviness (W(Sal)).

Preferably, the at least one of the first and second major surfaces of the functional layer S1 has an Auto-correlation length of waviness W(Sal), determined by means of the method cited in the description, of at least 50 µm, preferably in the range of 100-1500 µm, more preferably 150-1250 µm, most preferably 175-1000 µm.

It may also be preferred that at least one of the first and second major surfaces of the functional layer S1 has a waviness factor, determined as the ratio of the Root mean square roughness of waviness W(Sq) to the square of the Auto-correlation length of waviness W(Sal), in the range of $1 \cdot 10^{-6} - 1 \cdot 10^{-2}$, preferably $1 \cdot 10^{-5} - 5 \cdot 10^{-3}$, most preferably $5 \cdot 10^{-5} - 1 \cdot 10^{-3}$, wherein the parameters W(Sq) and W(Sal) are determined by means of the method cited in the description.

Method for Determining the 3D-Surface Roughness Parameters of Waviness

In determination of the 3D-surface roughness parameters of waviness, the surface geometry (primary profile) is first measured.

For measuring of the surface geometry, a sample sheet, preferably with a size of 80 mm (length)×30 mm (width), is adhered with the surface to be measured facing upwards to an glass sheet, preferably having a dimension of 100 mm (length)×100 mm (width)×3 mm (thickness), to ensure a completely planar lying of the sample sheet. A double-sided adhesive tape can be used in attaching the sample sheet to the glass sheet.

The surface geometry of the surface is measured with a 3D-laser measuring confocal microscope Olympus LEXT OLS4000 using the laser modus, a 5× objective lens/magnification with 1× optical zoom, a large-field observation with an image stitching of 25 single images and a measurement area of 1 cm² in the x-y-direction. In conducting the surface geometry measurements, the top and bottom limit of confocal acquisition in z-direction is preferably adjusted manually in the laser modus after adjusting the coarse and fine focus in the live color image modus.

The 3D-surface roughness parameters of waviness are then calculated based on the measured surface geometry with the Olympus LEXT OLS4000 Application Version 2.1.3 software. The 3D-surface roughness parameters for waviness are calculated using a primary dataset obtained from the optical measurements, which has been filtered using a profile filter λc having a value of 0.08 mm.

The functional layer S1 comprises 10-80 wt.-%, preferably 25-75 wt.-%, more preferably 30-70 wt.-%, most preferably 35-65 wt.-%, based on the total weight of the functional layer S1, of at least one thermoplastic polymer P1.

Preferably, the at least one thermoplastic polymer P1 is selected from the group consisting of ethylene-vinyl acetate copolymer (EVA), ethylene-acrylic ester copolymers, ethylene-α-olefin co-polymers, ethylene-propylene co-polymers, polypropylene (PP), polyethylene (PE), polyvinylchloride (PVC), polyethylene terephthalate (PET), polystyrene (PS), polyamides (PA), chlorosulfonated polyethylene (CSPE), ethylene propylene diene rubber (EPDM), and polyisobutylene (PIB). It may be preferable that the thermoplastic polymer P1 is selected from the group consisting of low-density polyethylene, linear low-density polyethylene, high-density polyethylene, ethylene-vinyl acetate copolymer (EVA), ethylene-acrylic ester copolymers, ethylene-α-olefin co-polymers, and ethylene-propylene co-polymers.

The functional layer S1 also comprises 10-80 wt.-%, preferably 25-75 wt.-%, more preferably 30-70 wt.-%, most preferably 35-65 wt.-%, based on the total weight of the functional layer S1, of at least one solid particulate filler F.

Preferably, the at least one solid particulate filler F is a mineral filler selected from inert mineral fillers and mineral binders.

The term "inert mineral filler" designates mineral fillers, which, unlike mineral binders are not reactive with water, i.e. do not undergo a hydration reaction in the presence of water. Preferably the inert mineral filler is selected from the group consisting of sand, granite, calcium carbonate, clay, expanded clay, diatomaceous earth, pumice, mica, kaolin, talc, dolomite, xonotlite, perlite, vermiculite, Wollastonite, barite, magnesium carbonate, calcium hydroxide, calcium aluminates, silica, fumed silica, fused silica, aerogels, glass beads, hollow glass spheres, ceramic spheres, bauxite, comminuted concrete, and zeolites.

The term "sand" designates in the present document mineral clastic sediments (clastic rocks) which are loose conglomerates (loose sediments) of round or angular small grains, which were detached from the original grain structure during the mechanical and chemical degradation and transported to their deposition point, said sediments having an $SiO_2$ content of greater than 50 wt.-%, in particular greater than 75 wt.-%, particularly preferably greater than 85 wt.-%.

By calcium carbonate as inert mineral filler is understood in the present document calcitic fillers produced from chalk, limestone or marble by grinding and/or precipitation.

According to one or more embodiments, the functional layer S1 comprises 10-80 wt.-%, preferably 25-75 wt.-%, more preferably 30-70 wt.-%, most preferably 35-65 wt.-%, based on the total weight of the functional layer S1, of at least one inert mineral filler selected from the group consisting of sand, granite, calcium carbonate, clay, expanded clay, diatomaceous earth, pumice, mica, kaolin, talc, dolomite, xonotlite, perlite, vermiculite, Wollastonite, barite, magnesium carbonate, calcium hydroxide, calcium aluminates, silica, fumed silica, fused silica, aerogels, glass beads, hollow glass spheres, ceramic spheres, bauxite, comminuted concrete, and zeolites.

According to one or more embodiments, the functional layer S1 comprises 10-80 wt.-%, preferably 25-75 wt.-%, more preferably 30-70 wt.-%, most preferably 35-65 wt.-%, based on the total weight of the functional layer S1, of comminuted concrete.

Preferably, the mineral binder is selected from the group consisting of hydraulic, non-hydraulic, latent hydraulic, and pozzolanic binders. The term "mineral binder" designates a binder, which in the presence of water reacts in a hydration reaction under formation of solid hydrates or hydrate phases. In particular, the term "mineral binder" refers to non-hydrated mineral binders, i.e. mineral binders, which have not been mixed with water and reacted in a hydration reaction.

According to one or more embodiments, the functional layer S1 comprises 10-80 wt.-%, preferably 25-75 wt.-%, more preferably 30-70 wt.-%, most preferably 35-65 wt.-%, based on the total weight of the functional layer S1, of at least one mineral binder selected from the group consisting of hydraulic, non-hydraulic, latent hydraulic, and pozzolanic binders.

The term "hydraulic binder" designates in the present document substances that harden as a result of chemical reactions with water ("hydration reactions") and produce hydrates that are not water-soluble. In particular, the hydration reactions of the hydraulic binder take essentially place independently of the water content. This means that hydraulic binders can harden and retain their strength even when exposed to water, for example underwater or under high humidity conditions. Examples of hydraulic binders include cement, cement clinker and hydraulic lime. In contrast, "non-hydraulic binders" such as air-slaked lime (non-hydraulic lime) and gypsum, are at least partially water soluble and must be kept dry in order to retain their strength.

The term "gypsum" designates in the present document any known form of gypsum, in particular calcium sulfate dehydrate, calcium sulfate α-hemihydrate, calcium sulfate β-hemihydrate, or calcium sulfate anhydrite or mixtures thereof.

The term "latent hydraulic binder" designates in the present document particular type II concrete additives with latent hydraulic character according to DIN EN 206-1:2000. These materials are calcium aluminosilicates that are not able to harden directly or harden too slowly when mixed with water. The hardening process is accelerated in the presence of alkaline activators, which break the chemical bonds in the binder's amorphous (or glassy) phase and promote the dissolution of ionic species and the formation of calcium aluminosilicate hydrate phases. Examples of latent hydraulic binders include granulated blast furnace slag.

The term "pozzolanic binders" designates in the present document in particular type II concrete additives with pozzolanic character according to DIN EN 206-1:2000. These materials are siliceous or aluminosilicate compounds that react with water and calcium hydroxide to form calcium silicate hydrate or calcium aluminosilicate hydrate phases. Pozzolanic binders include natural pozzolans such as trass and artificial pozzolans such as fly ash and silica fume.

According to one or more embodiments, the functional layer S1 comprises 10-80 wt.-%, preferably 25-75 wt.-%, more preferably 30-70 wt.-%, most preferably 35-65 wt.-%, based on the total weight of the functional layer S1, of cement or cement clinker.

The cement can be any conventional cement, for example, one in accordance with the five main cement types according to DIN EN 197-1: namely, Portland cement (CEM I), Portland composite cements (CEM II), blast-furnace cement (CEM III), pozzolan cement (CEM IV) and composite cement (CEM V). These main cement types are subdivided, depending on the amount added, into an additional 27 cement types, which are known to the person skilled in the art and listed in DIN EN 197-1. Naturally, all other cements that are produced according to another standard are also suitable, for example, according to ASTM standard or Indian standard. To the extent that reference is made here to cement types according to DIN standard, this naturally also relates to the corresponding cement compositions which are produced according to another cement standard.

According to one or more embodiments, the functional layer S1 comprises 1-60 wt.-%, preferably 2.5-55 wt.-%, more preferably 5-50 wt.-%, most preferably 10-40 wt.-%, of at least one inert mineral filler selected from the group consisting of sand, granite, calcium carbonate, clay, expanded clay, diatomaceous earth, pumice, mica, kaolin, talc, dolomite, xonotlite, perlite, vermiculite, Wollastonite, barite, magnesium carbonate, calcium hydroxide, calcium aluminates, silica, fumed silica, fused silica, aerogels, glass beads, hollow glass spheres, ceramic spheres, bauxite, comminuted concrete, and zeolites, and 1-60 wt.-%, preferably 2.5-55 wt.-%, more preferably 5-50 wt.-%, most preferably 10-40 wt.-%, of at least one mineral binder selected from the group consisting of hydraulic, non-hydraulic, latent hydraulic, and pozzolanic binders, in particular cement and cement clinker, all proportions being based on the total weight of the functional layer S1.

According to one or more embodiments, the functional layer S1 comprises 1-60 wt.-%, preferably 2.5-55 wt.-%, more preferably 5-50 wt.-%, most preferably 10-40 wt.-%, of comminuted concrete and 1-60 wt.-%, preferably 2.5-55 wt.-%, more preferably 5-50 wt.-%, most preferably 10-40 wt.-%, of at least one other inert mineral filler and/or at least one mineral binder selected from the group consisting of hydraulic, non-hydraulic, latent hydraulic, and pozzolanic binders, in particular cement and cement clinker, all proportions being based on the total weight of the functional layer S1.

In case the solid particulate filler F contained in the functional layer S1 comprises or consists of mineral binders, it is preferable that these mineral binders remain in a substantially non-hydrated state at least until the functional layer S1 is contacted with a composition containing water, such as with a fresh cementitious composition. In case the functional layer S1 contains hydrated mineral binders, for example, if comminuted concrete is used as solid particulate filler, it is essential that these do not form interconnected solid network of hydrated mineral binders. The presence of such solid networks of hydrated mineral binders in the functional layer S1 would significantly reduce the flexibility of the waterproofing system and also have a negative impact on the concrete adhesion strength. It has been found that the mineral binders contained in the functional layer S1 remain in a substantially non-hydrated state even if the waterproofing system is stored for several weeks at normal room temperature and relative humidity of 50%.

The at least one solid particulate filler F is preferably in the form of finely divided particles. The term "finely divided particles" refers to particles, whose median particle size $d_{50}$ does not exceed 500 µm. The term median particle size $d_{50}$ refers to a particle size below which 50% of all particles by volume are smaller than the $d_{50}$ value.

Preferably, the median particle size $d_{50}$ of the at least one solid particulate filler F is 1.0-300.0 µm, more preferably 1.5-250.0 µm, even more preferably 2.0-200.0 µm, most preferably 2.0-150.0 µm. It may be preferable that less than 40 wt.-%, more preferably less than 30 wt.-%, even more preferably less than 20-wt.-%, most preferably less than 10 wt.-% of the particles of the at least one solid particulate filler F have a particle size of less than 5 µm and/or that less than 40 wt.-%, more preferably less than 30 wt.-%, even more preferably less than 20-wt.-%, most preferably less than 10 wt.-% of the particles of the at least one solid particulate filler F have a particle size of above 100 µm.

Preferably, the overall particle size of the solid particulate filler F (of at least 98% of the particles) is below 250 µm, more preferably below 200 µm, even more preferably below 100 µm.

It has also been found that the concrete adhesion strength of the waterproofing system is further improved by the presence of at least one surfactant in the functional layer S1. The term "surfactant" refers in the present document to surface tension lowering substances, which are usually organic compounds containing both hydrophobic and hydrophilic groups. Based on the charge of the hydrophilic group the surfactants are classified to anionic, cationic, amphoteric, non-ionic surfactants.

It is believed that the presence of surfactants in the functional layer S1 lowers the surface tension of water contained in a fresh cementitious composition, which further enhances the ability of the fresh cementitious composition to wet the surface of the functional layer S1 and to form an interlocking mechanical bond between the waterproofing system and the cementitious composition upon hardening.

According to one or more embodiments, the functional layer S1 further comprises at least one surfactant SF selected from the group consisting of anionic, cationic, amphoteric, non-ionic, and polymeric surfactants.

Examples of suitable anionic surfactants include surfactants containing carboxylate, sulfate, phosphate or sulfonate groups, such as amino acid derivatives; fatty alcohol ether sulfates; fatty alcohol sulfates; soaps; alkylphenol ethoxylates; fatty alcohol ethoxylates; alkanesulfonates; olefinsulfonates; and alkyl phosphates.

Examples of suitable cationic surfactants include quaternary ammonium or phosphonium compounds, such as, for example, tetraalkylammonium salts; N,N-dialkylimidazoline compounds; dimethyldistearylammonium compounds, N-alkylpyridine compounds; and ammonium chlorides.

Amphoteric (zwitterionic) surfactants have both cationic and anionic centers attached to the same molecule. Examples of suitable amphoteric surfactants include amphoteric electrolytes such as aminocarboxylic acid and betaines.

Examples of suitable non-ionic surfactants include ethoxylates, such as, for example, ethoxylated adducts of alcohols, such as polyoxyalkylene polyols; amines; fatty acids; fatty acid amides; alkylphenols; ethanolamides; fatty amines; polysiloxanes; fatty acid esters; alkyl or alkylphenyl polyglycol ethers, such as, for example, fatty alcohol polyglycol ethers; alkylglycosides; sugar esters; sorbitan esters; polysorbates or trialkylamine oxides; esters and amides of poly(meth)acrylic acids with polyalkylene glycols or aminopolyalkylene glycols, which at most may be tacked at one end with alkyl groups.

Polymeric surfactants can be divided into two groups of compounds. The first group includes comb or rake polymers where there is an organic polymeric chain with hydrophobic groups at regular intervals along the chain and hydrophilic groups at random or regular intervals along that chain. The second group of polymeric surfactants includes block co-polymers where there are blocks of hydrophobic groups (B) and blocks of hydrophilic groups (A) usually in A-B-A configuration. Certain polymeric surfactants such as ethylene oxide-propylene oxide co-polymer surfactants can also be classified as non-ionic surfactants.

Increasing the amount of the at least one surfactant SF in the functional layer S1 increases the ability of a fresh cementitious composition to wet the surface of the functional layer S1, which enables higher concrete adhesion strength. The surfactants, however, also have a tendency to migrate from the functional layer S1 towards the interphase between the functional layer and the hardened cementitious composition. In case the amount of the at least one surfactant SF in the functional layer S1 is increased above a certain threshold limit, the hydration of cement grains is inhibited in the cementitious composition resulting in a very weak or non-existent adhesion between the functional layer S1 and the cementitious composition after hardening.

Preferably, the at least one surfactant SF is present in the functional layer S1 in a total amount of at least 0.05 wt.-%, based on the total weight of the functional layer S1. It may be advantageous that the at least one surfactant SF is present in the functional layer S1 in a total amount of 0.05-5.0 wt.-%, preferably 0.1-4.0 wt.-%, more preferably 0.1-3.0 wt.-%, most preferably 0.25-2.0 wt.-%, based on the total weight of the functional layer S1.

Preferably, the at least one surfactant SF is selected from the group consisting of glycerol monostearates, polycarboxylate ethers, polyether-modified polysiloxanes, polyalkylene oxide siloxanes, hydroxyethyl amines, erucamides, stearyl stearamides, alkali metal alkanesulfonates, and alkyl aryl sulfonates.

Examples of suitable commercially available glycerol monostearates include Dimodan HP (from Danisco).

Examples of suitable polycarboxylate ethers include polycarboxylate ether-based superplasticizers (PCEs), which are composed by a methoxy-polyethylene glycol copolymer (side chain) grafted with methacrylic acid copolymer (main chain). Suitable commercially available polycarboxylate ether-based superplasticizers include Viscocrete® Polymer PC-2, Viscocrete® Polymer RMC-2, and Cemerol® R-750 MC (from Sika).

Examples of suitable polyether-modified polysiloxanes include polyetherpolysiloxane copolymers. Suitable commercially available polyether-modified polysiloxanes include Tegostab B8870 (from Evonik).

Examples of suitable commercially available polyalkylene oxide siloxanes include Niax L-1500 (from Momentive).

Examples of suitable hydroxyethyl amines include bis(2-hydroxyethyl) amines, which are commercially available as Armostat 300 (from Akzo Nobel).

Examples of suitable commercially available erucamides and stearyl stearamides include Kemamide E180 and Kemamide S180 (from PMC Biogenix).

Examples of suitable alkali metal alkanesulfonates include sodium alkanesulfonates, which are commercially available as Armostat 3002 (from Akzo Nobel) and Loxiol 93P (from Emery Oleochemicals).

Examples of suitable commercially available alkylarylsulfonates include ZetaSphere 2300, 3100 and 3700 (from Airproducts).

According to one or more embodiments, the functional layer S1 comprises at least one surfactant SF selected from the group consisting of glycerol monostearates, polycarboxylate ethers, polyether-modified polysiloxanes, polyalkylene oxide siloxanes, hydroxyethyl amines, erucamides, stearyl stearamides, alkali metal alkanesulfonates, and alkyl aryl sulfonates, wherein the at least one surfactant SF is present in the functional layer S1 in a total amount of 0.05-5.0 wt.-%, preferably 0.1-4.0 wt.-%, more preferably 0.1-3.0 wt.-%, most preferably 0.25-2.0 wt.-%, based on the total weight of the functional layer S1.

In waterproofing applications, one of the important characteristics is the strength of adhesion by which a waterproofing system is bonded to a substrate, for example a concrete surface, to be sealed against water penetration. In case the strength of adhesion is too low, gaps are more easily formed between the system and the surface of the substrate, which may lead to loss of water tightness.

Preferably, the waterproofing system has concrete adhesion strength of at least 5 N/50 mm, more preferably at least 10 N/50 mm, even more preferably of at least 15 N/50 mm, most preferably of at least 20 N/50 mm. In particular, the waterproofing system may have concrete adhesion strength in the range of 5-300 N/50 mm, preferably of 10-250 N/50 mm, more preferably of 15-200 N/50 mm, most preferably of 20-200 N/50 mm.

In the context of the present invention, the concrete adhesion strength of a waterproofing system is determined using the measurement method described below.

Method for Determining the Concrete Adhesion Strength of a Waterproofing System

For the measurement of the average peel resistance, a concrete test specimen having a waterproofing system adhered on its surface using a concrete composition is first prepared.

A sample strip with dimensions of 200 mm (length)×50 mm (width) is first cut from the waterproofing system. One edge of the sample strip on the side of the functional layer is covered with an adhesive tape having a length of 50 mm and a width coinciding with the width of the sample waterproofing system to prevent the adhesion to the hardened concrete. The adhesive tapes are used to provide easier installation of the concrete test specimens to the peel resistance testing apparatus. The sample strip is then placed into a formwork having a dimension of 200 mm (length)×50 mm (width)×30 mm (height) with the functional layer facing upwards and the barrier layer, if present, facing the bottom of the formwork.

For the preparation of the concrete specimen, a fresh concrete formulation is prepared by mixing 92.06 wt.-% of a concrete dry batch of type MC 0.45 with 7.73 wt.-% of water and 0.21 wt.-% of Sikament-12S for five minutes in a tumbling mixer. The concrete dry batch of type MC 0.45 contains 17.21 wt.-% of CEM I 42.5 N cement (preferably Normo 4, Holcim) and 74.84 wt.-% of aggregates containing 3.0 wt.-% of Nekafill-15 (from KFN) concrete additive (limestone filler), 24.0 wt.-% of sand having a particle size of 0-1 mm, 36.0 wt.-% of sand having a particle size of 1-4 mm, and 37 wt.-% of gravel having a particle size of 4-8 mm. Before blending with water and Sikament-12S the concrete dry batch is homogenized for five minutes in a tumbling mixer.

The formwork containing the sample strip is subsequently filled with the fresh concrete formulation and vibrated for two minutes to release the entrapped air. After hardening for one day the concrete specimen is stripped from the formwork and stored under standard atmosphere (air temperature 23° C., relative air humidity 50%) for 28 days before measuring the average peel resistance.

The average peel resistance upon peeling the sample strip from the surface of the concrete specimen is measured using a Zwick Roell AllroundLine Z010 material testing apparatus equipped with a Zwick Roell 90°-peeling device or using a similar testing apparatus fulfilling the requirements of the DIN EN 1372 standard.

In the peel resistance measurement, the concrete specimen is clamped with the upper grip of the material testing apparatus for a length of 10 mm at the end of the concrete specimen comprising the taped section of the sample strip. Following, the sample strip is peeled off from the surface of the concrete specimen at a peeling angle of 90° and at a constant cross beam speed of 100±10 mm/min. During the peel resistance measurement the distance of the rolls is preferably approximately 570 mm. The peeling of the sample strip is continued until a length of approximately 140 mm of the sample strip is peeled off from the surface of the concrete specimen. The average peel resistance is calculated as average peel force per unit width of the strip [N/50 mm] during peeling over a length of approximately 70 mm thus excluding the first and last quarter of the total peeling length from the calculation.

There are no particular restrictions for the thickness of the functional layer S1. The suitable thickness of the functional layer S1 depends on the intended field of application and on the build-up of the waterproofing system. Typically, functional layers with a thickness of above 25 mm are not practical, at least not for use as waterproofing membranes or roofing membranes. On the other hand, functional layers with a thickness of below 10 μm have been found to be difficult to produce, at least with the desired surface roughness/waviness of the functional layer. The functional layer S1 may have a thickness of at least 0.05 mm, in particular 0.05-15.0 mm, preferably 0.1-10.0 mm, more preferably 0.1-5.0 mm, even more preferably 0.25-2.5 mm, most preferably 0.35-2.5 mm.

The preferred thickness of the functional layer S1 also depends on the build-up of the waterproofing system, for example on the number of layers contained in the waterproofing system. In case the waterproofing system comprises, in addition to the functional layer S1, at least one other layer, such as a barrier layer, the thickness of the functional layer may be at least 0.05 mm, in particular 0.05-10.0 mm, preferably 0.05-5.0 mm, more preferably 0.1-2.5 mm, even more preferably 0.2-2.5 mm, most preferably 0.25-2.0 mm.

In case the waterproofing system consists essentially of functional layer the S1, in particular if the waterproofing system does not comprise any other layers, in particular thermoplastic barrier layers, the thickness of the functional layer may be at least 0.1 mm, preferably 0.1-15.0 mm, more preferably 0.25-10.0 mm, even more preferably 0.35-7.5 mm, most preferably 0.5-5.0 mm.

In the context of the present invention, the thickness of the functional layer S1 is determined by using a measurement method as defined in DIN EN 1849-2 standard. An optical microscope, such as of type Keyence VHX-600 with 30-fold magnification, can be used for measuring the thicknesses of the layer cross sections.

In order to improve the mechanical properties of the functional layer S1, it can be advantageous that the functional layer S1 is reinforced with a layer of fiber material bonded to at least one of its major surfaces. The reinforcement layer can be in the form of a fiber mat, a fiber-woven fabric or a fibrous tissue. Particularly suitable materials for the reinforcement layer include glass fibers, polyester fibers and nylon fibers. It may be advantageous that the functional layer S1 comprises a first and second reinforcement layers bonded to the first and second major surfaces of the functional layer S1, respectively.

According to one or more embodiments, the waterproofing system further comprises a barrier layer S2 having a first major surface and a second major surface, wherein the barrier layer S2 comprises at least one thermoplastic polymer P2, and wherein the second major surface of the functional layer S1 and the first major surface of the barrier layer are directly connected to each other over at least parts of their areas.

The functional layer S1 and the barrier layer S2 are sheet-like elements having first and second major surfaces defined by peripheral edges. The expression "directly connected" is understood to mean in the context of the present invention that no further layer or substance is present between the layers, and that the opposing surfaces of the two layers are directly bonded to each other or adhere to each other. At the transition area between the two layers, the materials forming the layers can also be present mixed with each other.

The thickness of the barrier layer S2 is not subjected to any particular restrictions. However, waterproofing systems comprising a barrier layer having a thickness of above 15 mm or below 10 μm are usually not practical in waterproofing applications. The thickness of the barrier layer S2 may be at least 0.05 mm, preferably in the range of 0.05-15.0 mm, more preferably 0.1-7.5 mm, most preferably 0.2-5.0 mm. The thickness of the barrier layer can be determined using the method as defined in EN 1849-2 standard.

According to one or more embodiments, the waterproofing system further comprises a barrier layer S2 having a first major surface and a second major surface, wherein the barrier layer S2 comprises at least one thermoplastic polymer P2, and wherein the second major surface of the functional layer S1 and the first major surface of the barrier layer are directly connected to each other over at least parts of their areas, and a second functional layer S1' having a first major surface and a second major surface, wherein the first major surface of the second functional layer S1' and the second major surface of the barrier layer S2 are directly connected to each other over at least parts of their areas, and wherein the second functional S1' layer comprises:
  a) 10-80 wt.-%, preferably 25-75 wt.-%, of at least one thermoplastic polymer P1',
  b) 10-80 wt.-%, preferably 25-75 wt.-%, of at least one solid particulate filler F', said proportions being based on the total weight of the second functional layer S1', and wherein
  in the second functional layer S1', the particles of the at least one solid particulate filler F are dispersed in a continuous thermoplastic phase comprising the at least one thermoplastic polymer P1', Preferably, the second major surface of the second functional layer S1' has a waviness factor, determined as the ratio of the Root mean square roughness of waviness W(Sq) to the square of the Auto-correlation length of waviness W(Sal), in the range of $1 \cdot 10^{-6} - 1 \cdot 10^{-2}$, preferably $1 \cdot 10^{-5} - 5 \cdot 10^{-3}$, most preferably $5 \cdot 10^{-5} - 1 \cdot 10^{-3}$, wherein the parameters W(Sq) and W(Sal) are determined by means of the method cited in the description.

According to one or more embodiments, the second functional layer S1' further comprises at least one surfactant SF', which is present in the second functional layer S1' in a total amount of at least 0.05 wt.-%, based on the total weight of the second functional layer. It may be advantageous that the at least one surfactant SF' is present in the second functional layer S1' in a total amount of 0.05-5.0 wt.-%, preferably 0.1-4.0 wt.-%, more preferably 0.1-3.0 wt.-%, most preferably 0.25-2.0 wt.-%, based on the total weight of the second thermoplastic composition.

Any kind of thermoplastic polymer is in principle suitable to be used in the functional layers S1 and S1' and in the barrier layer S2. Suitable thermoplastic polymers P1, P1', and P2 can have a melting point, for example, in the range of 25-250° C., preferably 55-225° C., more preferably 60-200° C., most preferably 65-150° C. The term "melting point" refers in the present document to the maximum of the curve determined according to ISO 11357 standard by means of dynamic differential calorimetry (DSC). At the melting point the material undergoes transition from the solid to the liquid state. The measurements can be performed with a Mettler Toledo 822e device at a heating rate of 2 degrees centigrade/min and the melting point values can be determined from the measured DSC curve with the help of the DSC software.

The glass transition temperature ($T_g$) of the thermoplastic polymers P1, P1', and P2 is preferably below the temperatures occurring during the use of the waterproofing system. It is therefore preferred that the $T_g$ of the at least one thermoplastic polymers P1, P1', and P2 is below 0° C., more preferably below −15° C., most preferably below −30° C. The term "glass transition temperature" refers in the present document to the temperature measured by DSC according to ISO 11357 standard above which temperature a polymer component becomes soft and pliable, and below which it becomes hard and glassy. The measurements can be performed with a Mettler Toledo 822e device at a heating rate of 2 degrees centigrade/min and the $T_g$ values can be determined from the measured DSC curve with the help of the DSC software.

Preferably, the at least one thermoplastic polymer P1, the at least one thermoplastic polymer P1', and the at least one thermoplastic polymer P2 are selected from the group consisting of ethylene-vinyl acetate copolymer (EVA), ethylene-acrylic ester copolymers, ethylene-α-olefin co-polymers, ethylene-propylene co-polymers, polypropylene (PP), polyethylene (PE), polyvinylchloride (PVC), polyethylene terephthalate (PET), polystyrene (PS), polyamides (PA), chlorosulfonated polyethylene (CSPE), ethylene propylene diene rubber (EPDM), and polyisobutylene (PIB). It may be preferable that the thermoplastic polymers P1, P1', and P2 are selected from the group consisting of low-density polyethylene, linear low-density polyethylene, high-density polyethylene, ethylene-vinyl acetate copolymer (EVA), ethylene-acrylic ester copolymers, ethylene-α-olefin co-polymers, and ethylene-propylene co-polymers.

Preferably, the at least one thermoplastic polymer P1 and P1' are miscible with the at least one thermoplastic polymer P2. More preferably, the at least one thermoplastic polymer P1 and P1' are weldable with the at least one thermoplastic polymer P2. The polymers being "weldable" with each other means here that a thermoplastic layer consisting of the thermoplastic polymer P1 or P1' can be homogenously joined by heat welding with another thermoplastic layer consisting of the thermoplastic polymer P2. According to one or more embodiments, the functional layer S1 contains only one thermoplastic polymer P1, the second functional layer S1' contains only one thermoplastic polymer P1', and the barrier layer contains only one thermoplastic polymer P2, which thermoplastic polymers P1, P1', and P2 are identical.

The preferences given above for the at least one solid particulate filler F and to the at least one surfactant SF apply equally to the at least one solid particulate filler F' and to the at least one surfactant SF'.

The functional layer S1 and the second functional layer S1' can comprise, in addition to the at least one thermoplastic polymer P1 and P1', the at least one solid particulate filler F and F', and the at least one surfactant SF and SF', respectively, additives such as UV- and heat stabilizers, antioxidants, plasticizers, flame retardants, dyes, pigments such as titanium dioxide and carbon black, matting agents, antistatic agents, impact modifiers, biocides, and processing aids such as lubricants, slip agents, antiblock agents, and denest aids The barrier layer S2 can comprise, in addition to the at least one thermoplastic polymer P2, additives such as UV- and heat stabilizers, antioxidants, plasticizers, flame retardants, dyes, pigments such as titanium dioxide and carbon black, matting agents, antistatic agents, impact modifiers, biocides, and processing aids such as lubricants, slip agents, antiblock agents, and denest aids.

The preferences given above for the at least one thermoplastic polymer P1, P1', and P2, for the at least one solid particulate filler F and F', and for the at least one surfactant SF and SF', apply equally to all aspects of the present invention unless otherwise stated.

Another subject of the present invention is a method for producing a waterproofing system comprising a functional layer S1 having a first major surface and a second major surface, the method comprising steps of extruding and/or calendaring a first thermoplastic composition to form said functional layer S1, and subjecting at least one of the first and second major surfaces of the functional layer S1 to a mechanical surface treatment step selected from the group consisting of grinding, brushing, and abrasive blasting, wherein the first thermoplastic composition comprises:
   a) 10-80 wt.-%, preferably 25-75 wt.-%, of at least one thermoplastic polymer P1,
   b) 10-80 wt.-%, preferably 25-75 wt.-%, of at least one solid particulate filler F, said proportions being based on the total weight of the first thermoplastic composition.

The term "mechanical surface treatment" refers in the present document any surface treatment involving a change in texture of the surface, which may involve removal of some amount of material.

Brushing can be conducted using any conventional brushes such as plate brushes, tool brushes, tube brushes, spiral brushes, circular brushes, belt brushes, roller brushes, and wire brushes. Suitable brushes to be used for mechanical surface treatment are equipped with bristles having sufficient stiffness to enable the modification of the surface texture. It may be preferred that the bristles have a flexural modulus measured according to ISO 178:2001 of at least 2500 MPa, preferably at least 3000 MPa. Particularly suitable materials for the bristles include metallic materials such as brass, phosphor bronze, carbon steel, and stainless steel, and plastics, preferably thermoset plastics.

Grinding can be conducted using any conventional grinding tool such as grinding wheel, cutter thread, sanding wheel, sand paper, buffer, file, preferably a grinding wheel or cutter thread, in particular a cutter thread.

The term "abrasive blasting" refers in the present document to propelling a stream of abrasive blasting material, typically solid particles, against a surface to be treated under high pressure to modify the surface texture. A pressurized fluid or a centrifugal wheel is used to propel the blasting material. The abrasive blasting can be conducted as dry blasting, typically using compressed air as the blasting medium, or as wet blasting. Wet blasting is accomplished by injecting the blasting material into a pressurized water stream or creating a slurry of blasting material and water that is pressurized or introduced into a compressed air stream.

Suitable blasting materials include metal particles, synthetic mineral particles such as glass and ceramics, natural mineral particles such as corundum and sand, synthetic organic particles, such as comminuted plastic, natural organic particles, such as walnut shells and corncobs, and particles of ice and dry-ice.

Preferably, the mechanical surface treatment step is selected from the group consisting of grinding and abrasive blasting, preferably dry abrasive blasting.

Due to ease of industrial scale application, it may be preferable that the mechanical surface treatment is abrasive blasting, preferably dry abrasive blasting, which is conducted using a blasting material selected from the group consisting of corundum, aluminum, steel, copper, metal alloys, slag, glass beads, glass pearls, glass powder, silicon oxide, silicon carbide, calcium carbonate, magnesium carbonate, sodium bicarbonate, sodium hydrogen carbonate, and plastic.

Preferably, the blasting material has median particle size $d_{50}$ in the range of 10-1000 μm, more preferably 10-750 μm, most preferably 25-500 μm. It may be preferable to use a relatively hard blasting material, for example blasting material having a Mosh hardness of 3-9, preferably 4-9, most preferably 5-9. It may also be possible to use softer blasting materials, such as those having a Mosh hardness of not more than 6, for example not more than 5, in particular not more than 4.

The first thermoplastic composition comprises 10-80 wt.-%, preferably 25-75 wt.-%, more preferably 30-70 wt.-%, most preferably 35-65 wt.-%, based on the total weight of the first thermoplastic composition, of at least one thermoplastic polymer P1.

The first thermoplastic composition also comprises 10-80 wt.-%, preferably 25-75 wt.-%, more preferably 30-70 wt.-%, most preferably 35-65 wt.-%, based on the total weight of the first thermoplastic composition, of at least one solid particulate filler F. Preferably, the at least one solid particulate filler F is a mineral filler selected from inert mineral fillers and mineral binders.

According to one or more embodiments, the first thermoplastic composition comprises 10-80 wt.-%, preferably 25-75 wt.-%, more preferably 30-70 wt.-%, most preferably 35-65 wt.-%, based on the total weight of the first thermoplastic composition, of at least one inert mineral filler selected from the group consisting of sand, granite, calcium carbonate, day, expanded day, diatomaceous earth, pumice, mica, kaolin, talc, dolomite, xonotlite, perlite, vermiculite, Wollastonite, barite, magnesium carbonate, calcium hydroxide, calcium aluminates, silica, fumed silica, fused silica, aerogels, glass beads, hollow glass spheres, ceramic spheres, bauxite, comminuted concrete, and zeolites.

According to one or more embodiments, the first thermoplastic composition comprises 10-80 wt.-%, preferably 25-75 wt.-%, more preferably 30-70 wt.-%, most preferably 35-65 wt.-%, based on the total weight of the first thermoplastic composition, of at least one mineral binder selected from the group consisting of hydraulic, non-hydraulic, latent hydraulic, and pozzolanic binders.

According to one or more embodiments, the first thermoplastic composition comprises 1-60 wt.-%, preferably 2.5-55 wt.-%, more preferably 5-50 wt.-%, most preferably 10-40 wt.-%, of at least one inert mineral filler selected from the group consisting of sand, granite, calcium carbonate, clay, expanded clay, diatomaceous earth, pumice, mica, kaolin, talc, dolomite, xonotlite, perlite, vermiculite, Wollastonite, barite, magnesium carbonate, calcium hydroxide, calcium aluminates, silica, fumed silica, fused silica, aerogels, glass beads, hollow glass spheres, ceramic spheres, bauxite, comminuted concrete, and zeolites, and 1-60 wt.-%, preferably 2.5-55 wt.-%, more preferably 5-50 wt.-%, most preferably 10-40 wt.-%, of at least one mineral binder selected from the group consisting of hydraulic, non-hydraulic, latent hydraulic, and pozzolanic binders, in particular cement and cement clinker, all proportions being based on the total weight of the first thermoplastic composition.

According to one or more embodiments, the first thermoplastic composition comprises 10-80 wt.-%, preferably 25-75 wt.-%, more preferably 30-70 wt.-%, most preferably 35-65 wt.-%, based on the total weight of the first thermoplastic composition, of comminuted concrete.

According to one or more embodiments, the first thermoplastic composition comprises 1-60 wt.-%, preferably 2.5-55 wt.-%, more preferably 5-50 wt.-%, most preferably 10-40 wt.-%, of comminuted concrete and 1-60 wt.-%, preferably 2.5-55 wt.-%, more preferably 5-50 wt.-%, most preferably 10-40 wt.-%, of at least one other inert mineral filler and/or a least one mineral binder selected from the group consisting of hydraulic, non-hydraulic, latent hydraulic, and pozzolanic binders, in particular cement and cement clinker, all proportions being based on the total weight of the first thermoplastic composition.

According to one or more embodiments, the first thermoplastic composition further comprises at least one surfactant SF, which is present in the first thermoplastic composition in a total amount of at least 0.05 wt.-%, based on the total weight of the first thermoplastic composition. It may be advantageous that the at least one surfactant SF is present in the first thermoplastic composition in a total amount of 0.05-5.0 wt.-%, preferably 0.1-4.0 wt.-%, more preferably 0.1-3.0 wt.-%, most preferably 0.25-2.0 wt.-%, based on the total weight of the first thermoplastic composition.

In case the first thermoplastic composition contains one or more mineral binders, the amount of water contained in the first thermoplastic composition, which may be present therein, for example, as physical blowing agent, should be low enough to keep the mineral binders in essentially non-hydrated form during the melt-processing and extrusion/calendering steps. Hydration of the mineral binders during the production process is not desired since it would significantly reduce the flexibility of the functional layer S1 due to the formation of interconnected solid networks of hydrated mineral binders. Flexibility of the functional layer S1 is essential in order to provide waterproofing systems, which can be stored and transported in form of rolls and which can be easily applied on the surface of the substrate to be waterproofed. Hydration of mineral binders may also decrease the concrete adhesion strength of the waterproofing system.

According to one or more preferred embodiments, the amount of water in the first thermoplastic composition is not more than 5 wt.-%, preferably not more than 2.5 wt.-%, more preferably not more than 1 wt.-%, most preferably not more than 0.5 wt.-%, based on the total weight of the first thermoplastic composition.

Preferably, the method for producing a waterproofing system comprises a further step of employing space apart calender cooling rolls through which the formed functional layer S1 is drawn immediately following the extrusion or calendering steps.

Extrusion Process

Preferably, an extrusion apparatus comprising at least one extruder and a die is used for extruding the first thermoplastic composition in the method for producing the waterproofing system. Such extrusion apparatuses are well known to a person skilled in the art. A suitable extruder comprises a barrel and a screw unit contained in the barrel or a ram. Any conventional extruders, for example, a ram extruder, single screw extruder, or a twin-screw extruder may be used. Preferably, the extruder is a screw extruder, more preferably a twin-screw extruder. The screw unit of a conventional screw extruder is typically considered to comprise feed, transition, and metering sections. In the feed section the thermoplastic composition enters the channels of the rotating screw and is conveyed towards the transition section, in which the composition is compressed and melted. The composition should be fully melted when it leaves the transition section. The function of the metering section is to homogenize the melted composition and to allow it to be metered or pumped out at constant rate. The extruder apparatus further comprises a die, preferably a flat die, consisting of manifold, approach, and lip regions. In case of a co-extrusion process, the extruder apparatus comprises at least two extruders, preferably twin-screw extruders, and a single manifold or a multi manifold die.

The extruder barrel comprises a feed port through which the material to be extruded is fed to the extruder and an outlet port through which the material leaves the barrel. The outlet port is coupled with the die via a gate or adapter piece.

A mixing device may be interposed between the barrel and the die. The feed port is generally connected with a hopper to which the material to be extruded is added. It is preferred that a screen pack and a breaker plate are positioned at the end of the barrel to avoid plugging in the nozzles. The extruder further comprises heating elements, cooling elements, temperature sensors and temperature control elements to provide temperature controlled zones along the barrel, also known as barrel zones. The extruder may comprise, for example, 3 to 8 barrel zones, preferably at least 5 barrel zones, by the use of which a temperature profile can be realized in the barrel.

Preferably, a significant part, preferably the entire amount of the at least one thermoplastic polymer P1 is fed into the extruder through the feed port. It may be preferred that at least part of the at least one solid particulate filler F is fed into the extruder through another port located downstream from the feed port. The term "downstream" designates in the present document the direction to the outlet port. For example, it may be advantageous that not more than 50 wt.-%, preferably not more than 30 wt.-%, more preferably not more than 10 wt.-%, of the total amount of the at least one solid particulate filler F is fed into the extruder through the feed port with the entire amount of the at least one thermoplastic polymer P1 and the remaining portion of the at least one solid particulate filler F is fed into the extruder through a another port located downstream from the feed port. It may also be preferable that only a portion of the at least one surfactant SF is fed to the extruder through the feed port and that at least 10 wt.-%, preferably at least 20 wt. % is fed into the extruder through another port located downstream from the feed port.

Some or all of the constituents of the first thermoplastic composition can also be mixed to obtain a premix, which is then fed into the extruder through the feed port. The premix can be carried out using a blending apparatus, which are known to a person skilled in the art. In a premixing process, the particles of the at least one thermoplastic polymer P1 are mixed at an elevated temperature with the other constituents, such as with the at least one solid particulate filler F to obtain a homogeneously mixed mixture. It is also possible to that some or all of the constituents of the first thermoplastic composition are processed in a compounding extruder to pellets or granules, which are fed into extruder though the feed port.

The extrusion temperature is preferably 80-250° C., more preferably 100-240° C., even more preferably 120-220° C., most preferably 140-200° C. The term "extrusion temperature" refers to the temperature of the extruded composition in the die outlet. Preferably, the extrusion pressure is 20-350 bar, preferably 30-240 bar, more preferably 35-200 bar, most preferably 40-130 bar. The "extrusion pressure" refers to the pressure of the composition at the end of the metering zone just before the composition enters the die inlet.

The extrusion process may be conducted by using different temperature profiles, such as an increasing temperature profile where the temperature increases downstream the barrel, a decreasing temperature profile where the temperature decreases downstream the barrel, and a humped temperature profile where the temperature increases from the feed port toward a certain set point, for example toward the middle of the barrel.

According to one or more embodiments, the waterproofing system further comprises a barrier layer S2 having a first and a second major surfaces and wherein the method comprises steps of:

i) Co-extruding the first thermoplastic composition and a second thermoplastic composition comprising at least one thermoplastic polymer P2 through a common die to form a composite article, wherein the first thermoplastic composition forms the functional layer S1 and the second thermoplastic composition forms the barrier layer S2, ii) Employing spaced apart calender cooling rolls through which the formed composite article is drawn immediately following step i), iii) Subjecting the major surface of the functional layer S1 not bonded to the barrier layer S2 to a mechanical surface treatment step selected from the group consisting of grinding, brushing, and abrasive blasting.

In this embodiment, a co-extruder comprising a first extruder for the first thermoplastic composition and a second extruder for the second thermoplastic composition and a die, preferably a flat die, is used. The first thermoplastic composition and the second thermoplastic compositions are extruded through the common die, which can be equipped with single or multi manifold, to simultaneously form the functional layer S1 and the barrier layer S2. The thickness of the extruded functional layer S1 and barrier layer S2 as well as the adhesion between the layers can be easily controlled by adjusting the die lip of the extruder apparatus and/or by adjusting the gap size between the calender cooling rolls.

The functional layer S1 and the barrier layer S2 are sheet-like elements having first and second major surfaces defined by peripheral edges. In the formed composite article, the functional layer S1 and the barrier layer S2 are directly connected to each other over at least parts of their opposing major surfaces.

Alternatively to the co-extrusion process, a waterproofing system comprising a functional layer S1 and a barrier layer S2 can be produced using two extruder apparatuses each comprising an extruder and a die, preferably a flat die. In this embodiment, the method for producing a waterproofing system comprises steps of:

i) Extruding the first thermoplastic composition using a first extrusion apparatus to form said first functional layer S1, ii) Extruding a second thermoplastic composition comprising at least one thermoplastic polymer P2 using a second extrusion apparatus to form said barrier layer S2, iii) Bonding the formed first functional layer S1 to the formed barrier layer S2 to form a composite article, iv) Employing a spaced apart calender cooling rolls through which the formed composite article is drawn immediately following step iii), v) Subjecting the major surface of the functional layer S1 not bonded to the barrier layer S2 to a mechanical surface treatment step selected from the group consisting of grinding, brushing, and abrasive blasting.

The formed functional layer S1 and barrier layer S2 can be bonded to each other using any conventional means such as calendering rolls or lamination wheels to form the composite article. Alternatively, the second thermoplastic composition comprising the at least one thermoplastic polymer P2 can be extruded directly on the surface of the formed functional layer S1 by using the second extrusion apparatus. In this case, the barrier layer S2 is simultaneously formed and bonded to the previously formed functional layer S1. It is also possible that the first thermoplastic composition is extruded directly on the surface of the formed barrier layer S2 using the extrusion apparatus. In this case, the functional layer S1 is simultaneously formed and bonded to the previously formed barrier layer S2.

According to one or more embodiments, the waterproofing system further comprises a barrier layer S2 having a first and a second major surface and a second functional layer S1' having a first and second major surface, and the method comprises steps of:
i) Co-extruding the first thermoplastic composition and a second thermoplastic composition comprising at least one thermoplastic polymer P2 through a common die to form a two-layer composite article, wherein the first thermoplastic composition forms the first functional layer and the second thermoplastic composition forms the barrier layer S2,
ii) Extruding a third thermoplastic composition using an extrusion apparatus to form said second functional layer S1',
iii) Bonding the formed second functional layer S1' to said two-layer composite article to form a three-layer composite article,
iv) Employing spaced apart calender cooling rolls through which the formed three-layer composite article is drawn immediately following step iii),
v) Subjecting the major surface of the functional layer S1 and/or the major surface of the functional layer S1' not bonded to the barrier layer S2 to a mechanical surface treatment step selected from the group consisting of grinding, brushing, and abrasive blasting.

In the obtained three-layer composite article, the second major surface of the functional layer S1 and the first major surface of the barrier layer S2 are directly connected to each other over at least parts of their areas and the second major surface of the barrier layer S2 and the first major surface of the second functional layer S1' are directly connected to each other over at least parts of their areas.

Alternatively, the three-layer composite article comprising the first functional layer S1, the barrier layer S2, and the second functional layer S1' can be formed by co-extruding the first thermoplastic composition, the second thermoplastic composition, and the third thermoplastic composition through a common die. In this embodiment, a co-extrusion apparatus comprising a first extruder for the first thermoplastic composition, a second extruder for the second thermoplastic composition, and a third extruder for the third thermoplastic composition, is used. The first, second and third thermoplastic compositions are melt-processed in the extruders and simultaneously extruded through the common die, which can be equipped with single or multi manifold. The thickness of the extruded layers S1, S2, and S1' as well as the adhesion between the layers can be easily controlled by adjusting the die lip of the co-extruder apparatus and/or by adjusting the gap size between the calender cooling rolls.

Preferably, the third thermoplastic polymer composition comprises:
a) 10-80 wt.-%, preferably 25-75 wt.-%, of at least one thermoplastic polymer P1',
b) 10-80 wt.-%, preferably 25-75 wt.-%, of at least one solid particulate filler F'.

According to one or more embodiments, the third thermoplastic composition further comprises at least one surfactant SF', which is present in the third thermoplastic composition in a total amount of at least 0.05 wt.-%, based on the total weight of the third thermoplastic composition. It may be advantageous that the at least one surfactant SF' is present in the third thermoplastic composition in a total amount of 0.05-5.0 wt.-%, preferably 0.1-4.0 wt.-%, more preferably 0.1-3.0 wt.-%, most preferably 0.25-2.0 wt.-%, based on the total weight of third thermoplastic composition.

The first thermoplastic composition and the third thermoplastic compositions can comprise, in addition to the at least one thermoplastic polymer P1 and P1', the at least one solid particulate filler F and F', and the at least one surfactant SF and SF', respectively, additives such as UV- and heat stabilizers, antioxidants, plasticizers, flame retardants, dyes, pigments such as titanium dioxide and carbon black, matting agents, antistatic agents, impact modifiers, biocides, and processing aids such as lubricants, slip agents, antiblock agents, and denest aids The second thermoplastic composition can comprise, in addition to the at least one thermoplastic polymer P2, additives UV- and heat stabilizers, antioxidants, plasticizers, flame retardants, dyes, pigments such as titanium dioxide and carbon black, matting agents, antistatic agents, impact modifiers, biocides, and processing aids such as lubricants, slip agents, antiblock agents, and denest aids.

Another subject of the present invention is a single or multiple layer waterproofing system obtainable by using the method according to the present invention.

Another subject of the present invention is use of a mechanical surface treatment step selected from the group consisting of grinding, brushing, and abrasive blasting, to increase the waviness factor of a surface of a functional layer S1 comprising:
a) 10-80 wt.-%, preferably 25-75 wt.-%, of at least one thermoplastic polymer P1,
b) 10-80 wt.-%, preferably 25-75 wt.-%, of at least one solid particulate filler F, said proportions being based on the total weight of the functional layer S1, wherein the waviness factor is determined as the ratio of the Root mean square roughness of waviness W(Sq) to the square of the Auto-correlation length of waviness W(Sal), and wherein the parameters W(Sq) and W(Sal) are determined by means of the method cited in the description.

Preferably, in the functional layer S1, the particles of the at least one solid particulate filler F are dispersed in a continuous thermoplastic phase comprising the at least one thermoplastic polymer P1.

Still another subject of the present invention is a method for waterproofing a substrate. The substrate can be any structural or civil engineering structure, which is to be sealed against moisture and water. The surface of the substrate can be orientated horizontally or not.

In case the waterproofing system does not comprise a barrier layer S2, the method for waterproofing a substrate comprises steps of:
applying a waterproofing system according to the present invention to a surface of a substrate such that a first major surface of the functional layer S1 is directed against the surface of the substrate,
casting a fresh cementitious composition on a second major surface of the functional layer S1, and
hardening the fresh cementitious composition.

In case the waterproofing system comprises a functional layer S1 and a barrier layer S2, the method for waterproofing a substrate comprises steps of:
applying a waterproofing system according to the present invention to a surface of a substrate such that the second major surface of the barrier layer S2 facing away from the functional layer S1 is directed against the surface of the substrate, casting a fresh cementitious composition on the first major surface of the functional layer S1 facing away from the barrier layer S2, and hardening the fresh cementitious composition.

Preferably, the fresh cementitious composition is a fresh concrete composition.

The casted cementitious composition after hardening can be part of a structure, in particular, an above-ground or underground structure, for example a building, garage, tunnel, landfill, water retention, pond, dike or an element for use in pre-fabricated constructions.

Still another subject of the present invention is a waterproofed construction for waterproofing a substrate against water penetration.

In case the waterproofing system does not comprise a barrier layer S2, the waterproofed construction comprises a layer of concrete and a waterproofing system according to the present invention arranged between the surface of the substrate and the layer of concrete such that the first major surface of the functional layer S1 is directed against the surface of the substrate and the second major surface of the functional layer S1 is fully bonded to the surface of the layer of concrete.

In case the waterproofing system comprises a functional layer S1 and barrier layer S2, the waterproofed construction comprises a layer of concrete and a waterproofing system according to the present invention arranged between the surface of the substrate and the layer of concrete such that the second major surface of the barrier layer S2 facing away from the functional layer S1 is directed against the surface of the substrate and the first major surface of the functional layer S1 facing away from the barrier S2 layer is fully bonded to the surface of the layer of concrete.

The term "fully bonded" refers in the present document to two surfaces being adhesively joined over the full surface.

The substrate can be any structural or civil engineering structure, which is to be sealed against moisture and water, such as a hardened concrete structure or a subsurface.

EXAMPLES

The materials shown in Table 1 were used in the examples.

TABLE 1

Materials used in the experiments

| Trade name | Composition | Provider |
|---|---|---|
| Polymer 1 | *EVA copolymer with 19 wt.-% of vinyl acetate | Eni Polimeri Europa |
| Surfactant | Surface active anionic compound | Emery Oleochemicals |
| Cement | CEM II/B-M (T-LL) 42.5 N SN EN 197-1 cement | LaFargeHolcim |

*EVA, ethylene vinyl acetate copolymer

Preparation of the Waterproofing Systems

The exemplary and reference double-layer waterproofing systems Ex1-Ex5 and Ref-1 comprising a functional layer and a barrier layer were produced using a laboratory scale co-extrusion apparatus comprising two twin screw extruders (Berstorff GmbH), a flat die and set of water-cooled calender rolls. A thermoplastic membrane based on EVA-LLDPE polymer blend was used as the barrier layer in all double-layer waterproofing systems.

A first mixture containing the constituents of the functional layer and a second mixture containing the constituents of the barrier layer were melt-processed in a first and second twin screw extruders and co-extruded through a common flat die on top of each other to produce a double-layer membrane, which was subsequently cooled between the calender rolls. The gap between the calender cooling rolls was adjusted to be somewhat smaller than the total thickness of the extruded membrane to bond the layers together. The thickness of the functional layers was approximately 0.5 mm and the thickness of the barrier layer was approximately 0.7 mm.

The compositions of the functional layers and operating conditions of the co-extrusion apparatus during production of the double-layer waterproofing systems are presented in Table 2. The extrusion temperature and pressure were measured at a point, where the melt-processed mass entered the inlet of the flat die. The temperature of the cooling rolls was approximately 20° C. during the production process.

Surface Treatment Method

The surface texture of each functional layer of a tested waterproofing system was modified by using different mechanical treatment techniques.

In Ex1 and Ex5 the surface of the functional layer was treated by using a standard thread cutter tool of type 1/4 NC20 and of type 1/2 NC13, respectively. In this treatment method, a sample strip of each waterproofing system with the functional layer facing outward was first wrapped (spanned) around a metal tube having a diameter of 15 cm. The surface of the functional layer was then grinded by using the thread cutter tool attached to a hand held electric drill. The revolution speed of the cutter thread was set to 500 rpm/min and the tool was moved back and forth, mainly in lengthwise direction of the surface, with an approximate speed of 15-20 cm/s. The pressure directed to the surface with the tool varied between 7.5 and 9.5 N.

In Ex2 the surface of the functional layer was brushed by hand using a wire brush having dimensions of 40 mm (width) and 105 mm (length). The bristles (total amount 1200) of the brush were made of stainless steel and had a diameter of 0.25 mm. In this treatment, a strip of the waterproofing system lying flat on a workbench with the functional layer facing upwards was brushed with stroking movements from the bottom to the top using relatively high pressure. The pressure applied to the surface with the wire brush varied between 30 and 60 N.

In Ex3 the surface of the functional layer was grinded using a grinding wheel having a grain size of 200-500 μm (grit size 40) until a homogeneous abrasion pattern was obtained. The functional layer was grinded by hand using circular movements while pressing the grinding wheel against the surface with a moderate pressure.

In Ex4 the surface of the functional layer was subjected to abrasive blasting using Lepco Micropeen 1100 ZP/ZPD blasting unit and corundum particles having average particles size 250-350 μm. Before the blasting treatment, a sample strip of the waterproofing system with the functional layer facing outward was wrapped (spanned) around a metal tube having a diameter of 15 cm. The corundum particles were blasted against the functional layer using a pressure of 5 bar, a jet distance of 10 cm, and a jet angle of 45°. The length of time period required to treat a surface having size of approximately 200 mm×300 mm was approximately 2 min.

Measurement of Thickness of the Layers

The thicknesses of the functional and barrier layers were determined by using a measurement method as defined in DIN EN 1849-2 standard. An optical microscope of type Keyence VHX-600 with 30-fold magnification was used for measuring the thickness of the cross sections.

Measurement of 3D-Surface Roughness Parameters for Waviness

For measuring the surface geometry of the functional layers, a sample membrane with a size of 100 mm (length)× 100 mm (width) was cut from each example membrane and adhered to an aluminum sheet having a dimension of 100 mm (length)×100 mm (width)×5 mm (height), with the functional layer facing upwards, to ensure a completely planar lying of the sample. A double-sided adhesive tape was used in attaching the sample to the aluminum sheet.

The surface geometry of each functional layer was measured with a 3D-laser measuring confocal microscope Olympus LEXT OLS4000 using the laser modus, a 5× objective lens/magnification with 1× optical zoom, a large-field observation with an image stitching of 25 single images and a measurement area of 1 cm2 in the x-y-direction. In conducting the surface geometry measurements, the top and bottom limit of confocal acquisition in z-direction was adjusted manually in the laser modus after adjusting the coarse and fine focus in the live color image modus.

The 3D-surface roughness parameters for waviness were calculated from the measured surface geometry with the attached Olympus LEXT OLS4000 Application Version 2.1.3 software. The 3D-surface roughness parameters W(Sq) and W(Sal) were calculated from a filtered primary dataset obtained from the optical measurements using a cutoff length $\lambda c = 0.08$ mm. The 3D-surface roughness parameters for waviness shown in Table 2 have been obtained as average from at least two measurements conducted at different locations on the surface of a functional layer of each sample membrane.

Preparation of the Concrete Test Specimen

Three sample strips with a dimension of 200 mm (length)×50 mm (width) were cut from each of the example waterproofing systems Ex 1-Ex 6 produced as described above. The sample strips were placed into formworks having a dimension of 200 mm (length)×50 mm (width)×30 mm (height) with the functional layer facing upwards and with the barrier layer against the bottom of the formwork.

One edge of each sample strip on the side of the functional layer was covered with an adhesive tape having a length of 50 mm and width coinciding with the width of the strip to prevent the adhesion to the hardened concrete. The adhesive tapes were used to provide easier installation of the test specimens to the peel resistance testing apparatus.

For the preparation of concrete specimens a batch of fresh concrete formulation was prepared. The fresh concrete formulation was obtained by mixing 8.9900 kg of a concrete dry batch of type MC 0.45 conforming to EN 1766 standard, 0.7553 kg of water and 0.0202 kg of Sikament-12S for five minutes in a tumbling mixer. The concrete dry batch of type MC 0.45 contained 1.6811 kg of CEM I 42.5 N cement (Normo 4, Holcim), 7.3089 kg of aggregates containing 3% Nekafill-15 (from KFN) concrete additive (limestone filler), 24% sand having a particle size of 0-1 mm, 36% sand having a particle size of 1-4 mm, and 37% gravel having a particle size of 4-8 mm. Before blending with water and Sikament-12S the concrete dry batch was homogenized for five minutes in a tumbling mixer.

The formworks containing the sample strips were subsequently filled with the fresh concrete formulation and vibrated for two minutes to release the entrapped air. After hardening for one day the test concrete specimens were stripped from the formworks and stored under standard atmosphere (air temperature 23° C., relative air humidity 50%) before measuring the peel resistances.

Measurement of Concrete Peel Resistances

The measurement of peel resistances was conducted in accordance with the procedure laid out in the standard DIN EN 1372:2015-06. A Zwick Roell AllroundLine Z010 material testing apparatus equipped with a Zwick Roell 90°-peeling device (type number 316237) was used for conducting the peel resistance measurements.

In the peel resistance measurements, a concrete specimen was clamped with the upper grip of the material testing apparatus for a length of 10 mm at the end of the concrete specimen comprising the taped section of the sample strip. Following, the strip was peeled off from the surface of the concrete specimen at a peeling angle of 90° and at a constant cross beam speed of 100 mm/min. During the measurements the distance of the rolls was approximately 570 mm. The peeling of the sample strip was continued until a length of approximately 140 mm of the strip was peeled off from the surface of the concrete specimen. The values for peel resistance were calculated as average peel force per width of the sample strip [N/50 mm] during peeling over a length of approximately 70 mm thus excluding the first and last quarter of the total peeling length from the calculation.

The average peel resistance values for the example waterproofing systems Ex1-Ex5 presented in Table 2 have been calculated as an average of three measurements conducted with the same waterproofing system.

TABLE 2

|  | Ref-1 | Ex1 | Ex2 | Ex3 | Ex4 | Ex5 |
| --- | --- | --- | --- | --- | --- | --- |
| Functional layer composition | | | | | | |
| Polymer 1 | 49 | 49 | 49 | 49 | 49 | 49 |
| Surfactant | 1 | 1 | 1 | 1 | 1 | 1 |
| Cement | 50 | 50 | 50 | 50 | 50 | 50 |
| Co-extruder conditions | | | | | | |
| $1^{st}$ extruder pressure, [bar] | 98 | 98 | 98 | 98 | 98 | 98 |
| $1^{st}$ extruder temperature, [° C.] | 168 | 168 | 168 | 168 | 168 | 168 |
| $1^{st}$ extruder flux, [kg/h] | 10.5 | 10.5 | 10.5 | 10.5 | 10.5 | 10.5 |
| $2^{nd}$ extruder pressure, [bar] | 90 | 90 | 90 | 90 | 90 | 90 |
| $2^{nd}$ extruder temperature, [° C.] | 180 | 180 | 180 | 180 | 180 | 180 |
| 2nd extruder flux, [kg/h] | 20.4 | 20.4 | 20.4 | 20.4 | 20.4 | 20.4 |
| Functional layer thickness, [mm] | 0.5 | 0.5 | 0.5 | 0.5 | 0.5 | 0.5 |
| Surface treatment | None | Thread cutter fine | Wire brush | Grinding wheel | Abrasive blasting | Thread cutter rough |

TABLE 2-continued

|  | Ref-1 | Ex1 | Ex2 | Ex3 | Ex4 | Ex5 |
|---|---|---|---|---|---|---|
| Surface properties | | | | | | |
| W(Sq) | 38.64 | 228.23 | 15.64 | 10.48 | 32.37 | 176.62 |
| W(Sal) | 5.02 | 635.15 | 645.21 | 401.69 | 188.52 | 896.32 |
| Waviness factor | 1.535 | $5.657 \cdot 10^{-04}$ | $3.757 \cdot 10^{-05}$ | $6.492 \cdot 10^{-05}$ | $9.106 \cdot 10^{-04}$ | $2.198 \cdot 10^{-04}$ |
| Concrete peel resistance (after 28 d), [N/50 mm] | 0 | 31 | 13 | 18 | 35 | 20 |

The invention claimed is:

1. A waterproofing system-membrane comprising a functional layer S1 having a first major surface and a second major surface, the functional layer S1 comprising:
 a) 10-80 wt.-%, of at least one thermoplastic polymer P1,
 b) 10-80 wt.-%, of at least one solid particulate filler F, said proportions being based on a total weight of the functional layer S1, wherein
 in the functional layer S1, the particles of the at least one solid particulate filler F are dispersed in a continuous thermoplastic phase comprising the at least one thermoplastic polymer P1, and wherein
 at least one of the first and second major surfaces of the functional layer S1 has an Auto-correlation length of waviness W(Sal) of at least 50 μm.

2. The waterproofing membrane according to claim 1, wherein at least one of the first and second major surfaces of the functional layer S1 has a waviness factor determined as a ratio of a Root mean square roughness of waviness W(Sq) to a square of the Auto-correlation length of waviness W(Sal) in a range of $1 \cdot 10^{-6}$-$1 \cdot 10^{-2}$.

3. The waterproofing membrane according to claim 1, wherein the at least one solid particulate filler F is selected from the group consisting of inert mineral fillers and mineral binders.

4. The waterproofing membrane according to claim 3, wherein the inert mineral filler is selected from the group consisting of sand, granite, calcium carbonate, clay, expanded clay, diatomaceous earth, pumice, mica, kaolin, talc, dolomite, xonotlite, perlite, vermiculite, Wollastonite, barite, magnesium carbonate, calcium hydroxide, calcium aluminates, silica, fumed silica, fused silica, aerogels, glass beads, hollow glass spheres, ceramic spheres, bauxite, comminuted concrete, and zeolites, and the mineral binder is selected from the group consisting of hydraulic binders, non-hydraulic binders, latent hydraulic binders, and pozzolanic binders.

5. The waterproofing membrane according to claim 1, wherein said functional layer S1 further comprises at least one surfactant SF, wherein an amount of the at least one surfactants SF is 0.05-5.0 wt.-%, based on the total weight of the functional layer S1.

6. The waterproofing membrane according to claim 5, wherein the at least one surfactant SF is selected from the group consisting of glycerol monostearates, polycarboxylate ethers, polyether-modified polysiloxanes, polyalkylene oxide siloxanes, hydroxyethyl amines, erucamides, stearyl stearamides, alkali metal alkanesulfonates, and alkyl aryl sulfonates.

7. The waterproofing membrane according to claim 1 further comprising a barrier layer S2 having a first major surface and a second major surface, wherein the barrier layer S2 comprises at least one thermoplastic polymer P2, and wherein the second major surface of the functional layer S1 and the first major surface of the barrier layer are directly connected to each other over at least parts of their areas.

8. The waterproofing membrane according to claim 7 further comprising a second functional layer S1' having a first major surface and a second major surface, wherein the first major surface of the second functional layer S1' and the second major surface of the barrier layer S2 are directly connected to each other over at least parts of their surfaces, and wherein the second functional S1' layer comprises:
 a) 10-80 wt.-%, of at least one thermoplastic polymer P1',
 b) 10-80 wt.-%, of at least one solid particulate filler F', said proportions being based on a total weight of the second functional layer S1',
and wherein in the second functional layer S1', the particles of the at least one solid particulate filler F' are dispersed in a continuous thermoplastic phase comprising the at least one thermoplastic polymer P1'.

9. The waterproofing membrane according to claim 1, wherein the Auto-correlation length of waviness W(Sal) is 100 to 1500 μm.

10. The waterproofing membrane according to claim 1, wherein the Auto-correlation length of waviness W(Sal) is 150 to 1250 μm.

11. The waterproofing membrane according to claim 1, wherein the Auto-correlation length of waviness W(Sal) is 175 to 1000 μm.

12. The waterproofing membrane according to claim 2, wherein the waviness factor is in a range of $1 \cdot 10^{-5}$-$1 \cdot 10^{-3}$.

13. The waterproofing membrane according to claim 2, wherein the waviness factor is in a range of $5 \cdot 10^{-5}$-$1 \cdot 10^{-3}$.

* * * * *